US009323871B2

(12) United States Patent
Lininger

(10) Patent No.: US 9,323,871 B2
(45) Date of Patent: Apr. 26, 2016

(54) COLLABORATIVE DEVELOPMENT OF A MODEL ON A NETWORK

(75) Inventor: Scott Lininger, Lafayette, CO (US)

(73) Assignee: Trimble Navigation Limited, Sunnyvale, CA (US)

(*) Notice: Subject to any disclaimer, the term of this patent is extended or adjusted under 35 U.S.C. 154(b) by 313 days.

(21) Appl. No.: 13/169,705

(22) Filed: Jun. 27, 2011

(65) Prior Publication Data

US 2012/0331061 A1     Dec. 27, 2012

(51) Int. Cl.
*G06F 15/16* (2006.01)
*G06F 17/50* (2006.01)

(52) U.S. Cl.
CPC ........ *G06F 17/5004* (2013.01); *G06F 2217/04* (2013.01)

(58) Field of Classification Search
USPC ........................................................... 709/205
See application file for complete search history.

(56) References Cited

U.S. PATENT DOCUMENTS

| 6,058,397 | A | 5/2000 | Barrus et al. |
|---|---|---|---|
| 6,158,903 | A | 12/2000 | Schaeffer et al. |
| 7,092,907 | B2 | 8/2006 | Kanevsky et al. |
| 7,139,444 | B2 | 11/2006 | Ameline et al. |
| 7,200,639 | B1 | 4/2007 | Yoshida |
| 7,516,132 | B1* | 4/2009 | Fast et al. ............................ 1/1 |
| 7,917,584 | B2 | 3/2011 | Arthursson |
| 2002/0069215 | A1 | 6/2002 | Orbanes et al. |
| 2002/0154144 | A1 | 10/2002 | Lofgren et al. |
| 2003/0021439 | A1 | 1/2003 | Lubin et al. |
| 2003/0135557 | A1* | 7/2003 | Davis ............................ 709/206 |
| 2004/0068187 | A1 | 4/2004 | Krause et al. |
| 2004/0153824 | A1* | 8/2004 | Devarajan et al. .............. 714/38 |
| 2004/0239679 | A1 | 12/2004 | Ito et al. |
| 2005/0081161 | A1 | 4/2005 | MacInnes et al. |
| 2005/0131659 | A1 | 6/2005 | Mei et al. |
| 2005/0165859 | A1 | 7/2005 | Geyer et al. |
| 2005/0171790 | A1* | 8/2005 | Blackmon ......................... 705/1 |
| 2006/0066609 | A1 | 3/2006 | Iodice et al. |

(Continued)

FOREIGN PATENT DOCUMENTS

| CA | 2781638 | 6/2011 |
|---|---|---|
| EP | 0899695 | 3/1999 |

(Continued)

OTHER PUBLICATIONS

International Search Report and Written Opinion for Application No. PCT/US2012/044297, dated Dec. 27, 2012.

(Continued)

*Primary Examiner* — Angela Nguyen
(74) *Attorney, Agent, or Firm* — Sheridan Ross P.C.

(57) ABSTRACT

An application programming interface (API) is provided for use with a modeling software. The API allows users at several devices operating on a network to collaboratively develop a model of an object or a group of objects. The API receives an indication that a selected component has been modified by the modeling software in accordance user commands, generates component data indicative of the modifications of the selected component, and causes an update indication to be transmitted to a collaboration server via a communication network to synchronize the selected component between the first computing device and a second computing device. The update indication may include a component identifier, such that the component identifier uniquely identifies the selected component in the model.

23 Claims, 6 Drawing Sheets

(56) References Cited

U.S. PATENT DOCUMENTS

| | | | |
|---|---|---|---|
| 2006/0119601 A1 | 6/2006 | Finlayson et al. | |
| 2006/0250418 A1 | 11/2006 | Chartier et al. | |
| 2007/0174027 A1* | 7/2007 | Moiseyev | 703/1 |
| 2008/0028323 A1* | 1/2008 | Rosen et al. | 715/752 |
| 2008/0046828 A1* | 2/2008 | Bibliowicz et al. | 715/751 |
| 2008/0140732 A1* | 6/2008 | Wilson et al. | 707/201 |
| 2008/0141334 A1 | 6/2008 | Wicker et al. | |
| 2008/0229234 A1 | 9/2008 | Astolfi et al. | |
| 2009/0046094 A1 | 2/2009 | Hamilton, II et al. | |
| 2009/0077119 A1 | 3/2009 | Speth et al. | |
| 2009/0141023 A1 | 6/2009 | Shuster | |
| 2009/0237411 A1 | 9/2009 | Gossweiler et al. | |
| 2010/0013842 A1 | 1/2010 | Green et al. | |
| 2010/0017461 A1 | 1/2010 | Kokkevis et al. | |
| 2010/0030578 A1 | 2/2010 | Siddique et al. | |
| 2010/0045662 A1 | 2/2010 | Boothroyd et al. | |
| 2010/0118039 A1 | 5/2010 | Labour | |
| 2010/0146085 A1* | 6/2010 | Van Wie et al. | 709/220 |
| 2010/0198563 A1 | 8/2010 | Plewe | |
| 2011/0025688 A1* | 2/2011 | Schneider et al. | 345/420 |
| 2011/0153368 A1 | 6/2011 | Pierre et al. | |
| 2011/0169826 A1 | 7/2011 | Elsberg et al. | |
| 2012/0054261 A1 | 3/2012 | Evans et al. | |
| 2012/0109591 A1* | 5/2012 | Thompson et al. | 703/1 |
| 2012/0117145 A1 | 5/2012 | Clift et al. | |
| 2013/0035904 A1 | 2/2013 | Kuhn | |
| 2013/0120367 A1 | 5/2013 | Miller et al. | |
| 2013/0120368 A1 | 5/2013 | Miller et al. | |
| 2013/0120369 A1 | 5/2013 | Miller et al. | |
| 2013/0132466 A1 | 5/2013 | Miller et al. | |
| 2013/0144566 A1 | 6/2013 | De Biswas | |
| 2014/0033265 A1 | 1/2014 | Leeds et al. | |

FOREIGN PATENT DOCUMENTS

| | | |
|---|---|---|
| EP | 1004068 | 5/2000 |
| EP | 2352120 | 8/2011 |
| JP | 2001-229401 | 8/2001 |
| JP | 2003-099805 | 4/2003 |
| JP | 2005-269280 | 9/2005 |
| WO | WO 2008/041061 | 4/2008 |
| WO | WO 2010/035266 | 4/2010 |

OTHER PUBLICATIONS

International Search Report for International (PCT) Patent Application No. PCT/US2012/064926, mailed Mar. 29, 2013 3 pages.
International Preliminary Report on Patentability for International (PCT) Patent Application No. PCT/US2012/064926, mailed May 30, 2014 6 pages.
International Search Report and Written Opinion for International (PCT) Patent Application No. PCT/US2012/064931, mailed Mar. 13, 2013 9 pages.
International Preliminary Report on Patentability for International (PCT) Patent Application No. PCT/US2012/064931, mailed Jun. 05, 2014 6 pages.
International Search Report and Written Opinion for International (PCT) Patent Application No. PCT/US2012/064932, mailed Mar. 22, 2013 11 pages.
International Preliminary Report on Patentability for International (PCT) Patent Application No. PCT/US2012/064932, mailed May 30, 2014 8 pages.
International Search Report and Written Opinion for International (PCT) Patent Application No. PCT/US2012/064940, mailed Mar. 26, 2013 9 pages.
International Preliminary Report on Patentability for Intenational (PCT) Patent Application No. PCT?US2012/064940, mailed May 30, 2014 8 pages.
International Preliminary Report on Patentability for International (PCT) Patent Application No. PCT/US2012/044297, mailed Jan. 16, 2014 8 pages.
Official Action for U.S. Appl. No. 13/676,323, mailed Mar. 24, 2015 63 pages.
Official Action for U.S. Appl. No. 13/676,340, mailed Jan. 6, 2015 20 pages.
Official Action for U.S. Appl. No. 13/676,330, mailed Nov. 19, 2014 28 pages.
Extended European Search Report for European Patent Application No. 12850623.5, dated Dec. 3, 2015, 7 pages.
Extended Search Report for European Patent Application No. 12850450.3, dated Jul. 15, 2015, 8 pages.
Official Action for U.S. Appl. No. 13/676,323, mailed Sep. 16, 2015, 76 pages.
Official Action for U.S. Appl. No. 13/676,340, mailed Aug. 12, 2015, 28 pages.
Notice of Allowance for U.S. Appl. No. 13/676,330, mailed Aug. 10, 2015, 8 pages.
Notice of Allowance for U.S. Appl. No. 13/676,338, mailed Aug. 12, 2015, 12 pages.
"Collaborative real-time editor" Wikipedia, the free encyclopedia, Nov. 7, 2011, 7 pages [retrieved from: http://en.wikipedia.org/w/index.php?title=Collaborative_real-time_editor&oldid=459190583].
Agustina et al. "CoMaya," Proceedings of the ACM 2008 Conference on Computer Supported Cooperative Work, CSCW '08, Jan. 1, 2008, pp. 5-8, XP055163225, ISBN: 978-1-60-558007-4.
Ammon et al., "Collaboration on Scene Graph Based 3D Data," from Advances in Computer Graphics and Computer Vision: Int'l Conferences VISAPP and GRAPP 2006, Braz et al. (eds), Springer-Verlag, 2007, pp. 78-90.
Koller et al. "Research Challenges for Digital Archives of 3D Cultural Heritage Models," ACM Journal on Computing and Cultural Heritage, Dec. 2009, vol. 2, No. 3, Article 7, 17 pages.
Ku et al., "3D Model-Based Collaboration in Design Development and Construction of Complex Shaped Buildings," Itcon, 2008, vol. 13, pp. 458-485.
Ohbuchi et al. "Watermarking Three-Dimensional Polygonal Models," Proceedings of the Fifth ACRM Internal Conference on Multimedia, 1997, pp. 261-272.
Shaojin et al. "An asynchronous CAD collaborative design model," Computer Application and System Modeling (ICCASM), 2010 International Conference On, IEEE, Piscataway, NJ, USA, Oct. 22, 2010, pp. V6-563-V6-568, XP031789329, ISBN: 978-1-4244-7235-2.
Sohn et al. "User transparent 3D watermarking system based on security policy," International conference on Cyberworlds, Oct. 2007, pp. 89-92.
Sun et al. "Transparent adaptation of single-user applications for multi-user real-time collaboration," ACM Transactions on Computer-Human Interaction, Dec. 1, 2006, vol. 13, No. 4, pp. 531-552, XP055163216, ISSN: 1073-0516.
Extended Search Report for European Patent Application No. 12849377.2, dated May 18, 2015, 6 pages.
Extended Search Report for European Patent Application No. 12851259.7, dated May 4, 2015, 6 pages.
Extended Search Report for European Patent Application No. 12804395.7, dated Jan. 28, 2015, 12 pages.
Official Action for U.S. Appl. No. 13/676,330, mailed Apr. 21, 2015, 34 pages.
Official Action for U.S. Appl. No. 13/676,338, mailed Mar. 31, 2015, 38 pages.

\* cited by examiner

COLLABORATIVE DEVELOPMENT OF A MODEL ON A NETWORK

FIELD OF THE DISCLOSURE

This disclosure relates to developing a three-dimensional model of an object or a group of objects and, in particular, to collaboratively developing a model on a communication network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, professional as well as non-professional users in a variety of different fields, such as engineering, architecture, automotive design, graphic design, advertising, fashion design, medicine, etc., can develop three-dimensional (3D) models of buildings, vehicles, and other objects using 3D modeling software that operates on a computing device. A user typically interacts with 3D modeling software via input devices such as a keyboard, mouse, trackball, and/or stylus, and the drafting document is displayed on a graphical display device, such as a computer monitor or screen.

In general, 3D modeling software allows a user to draw various three-dimensional shapes (directly or by defining two-dimensional faces that make up 3D shapes), apply colors and/or textures to the shapes, move, scale, rotate, and skew the shapes, etc. 3D software typically provides the user with stock objects such as arcs, circles, rectangles, and other known geometric shapes and/or provide tools to create such shapes. Further, 3D modeling software typically allows users to save models as files that conform to a certain predefined format. To share models, users transmit to each other files with the corresponding model data, or upload the files to data servers.

Users usually develop 3D models by sequentially entering various drawing and image manipulation commands via a graphical user interface (GUI). For example, to model a two-story building, a user may first draw a four-wall structure, draw a door in one of the walls, then draw several windows in the walls, etc. The user may then paint or texture the walls, the roof, and other portions of the model. Accordingly, it may take a significant amount of time for a single user to develop a complex and detailed model.

Further, to modify an existing model, a user typically uses 3D modeling software to open a file that stores model data, edit the model data, and save the model data to the file. In order for another user to safely edit the model, he or she must make another copy of the file or wait until the user currently editing the model finishes the edits and closes the file. In other words, when more than one user contributes to the development of a model, 3D modeling software receives input from only one user at a time.

SUMMARY

In an embodiment, a computer-readable medium stores an application programming interface (API) for use with a software application for developing a three-dimensional (3D) model. The 3D model is stored as model data and includes a plurality of components, each component having one or more elements. A collaboration server is communicatively coupled to the first computing device and the second computing device via a communication network. The API includes a set of instructions that, when executed on a processor of the first computing device, cause the processor to receive an indication that a selected one of the plurality of components has been modified by the software application in accordance with a set of one or more modification commands received from a user interface of the first computing device, generate component data indicative of the modifications of the selected component, and cause an update indication to be transmitted to the collaboration server via the communication network to synchronize the selected component between the first computing device and a second computing device. To cause the update indication to be transmitted to the collaboration server, the instructions cause the processor to provide the component data in the update indication, and provide a component identifier in the update indication, such that the component identifier uniquely identifies the selected component in the model.

In another embodiment, a method in a first computing device for developing a 3D model in collaboration with a second computing device operating independently of the first computing device, where the model includes a plurality of components and where each component has one or more elements, includes causing the model to be stored on a computer-readable medium as model data including a hierarchical tree data structure having a plurality of branches corresponding to the plurality of respective components, in response to a selected one of the plurality of components having been modified at the first computing device, generating a serialized representation of the branch that corresponds to the modified component, and causing the model to be synchronized between the first computing device and the second computing device. Causing the model to be synchronized includes causing an update indication to be transmitted to a collaboration server communicatively coupled to the first computing device and the second computing device, where the update indication includes the serialized representation of the one of the plurality of the branches and an indication of the set of transformation operations.

In another embodiment, a method for managing collaborative development of a three-dimensional (3D) model at a plurality of client devices is implemented in a network device. The client devices are communicatively coupled to the network device via a communication network. The method includes receiving a plurality of update indications from the client devices, including receiving indications of respective sets of one or more operations applied to on a component of the model, storing the sets of operations on an operation stack, including preserving a relative order of the operations applied to the component, where the operation stack includes data on a computer-readable medium, receiving an indication of a last operation performed on the component by another client device, using the transformations stack, generating a list of operations applied to the component that are subsequent to the last operation, and providing the list of operations to the client device from which the indication of the last transformation is received.

In still another embodiment, a method for collaboratively developing a three-dimensional model stored as model data on a computer-readable medium is implemented in a first computing device. The model data includes a hierarchical tree data structure having a plurality of branches corresponding to a plurality of respective components of the three-dimensional model, each component having one or more elements. The method includes receiving a selection of one of the plurality of components of the model from an interactive user interface of the computing device, receiving a plurality of modification commands from the user interface, where the modification commands correspond to a set of one or more transformation operations to be performed on the selected component, modifying the selected component in accordance with the set of transformation operations, generating a serialized representation of the one of the plurality of the branches that corresponds to the selected component, and causing the 3D model to be synchronized with a second computing device. Further, causing the 3D model to be synchronized with the second where device includes causing an update indication to be transmitted to a collaboration server, wherein the update indication includes the serialized representation of the one of the plurality of the branches and an indication of the set of transformation operations, and where the collaboration server is communicatively coupled to the first computing device and the second computing device.

DETAILED DESCRIPTION

Figure 1:
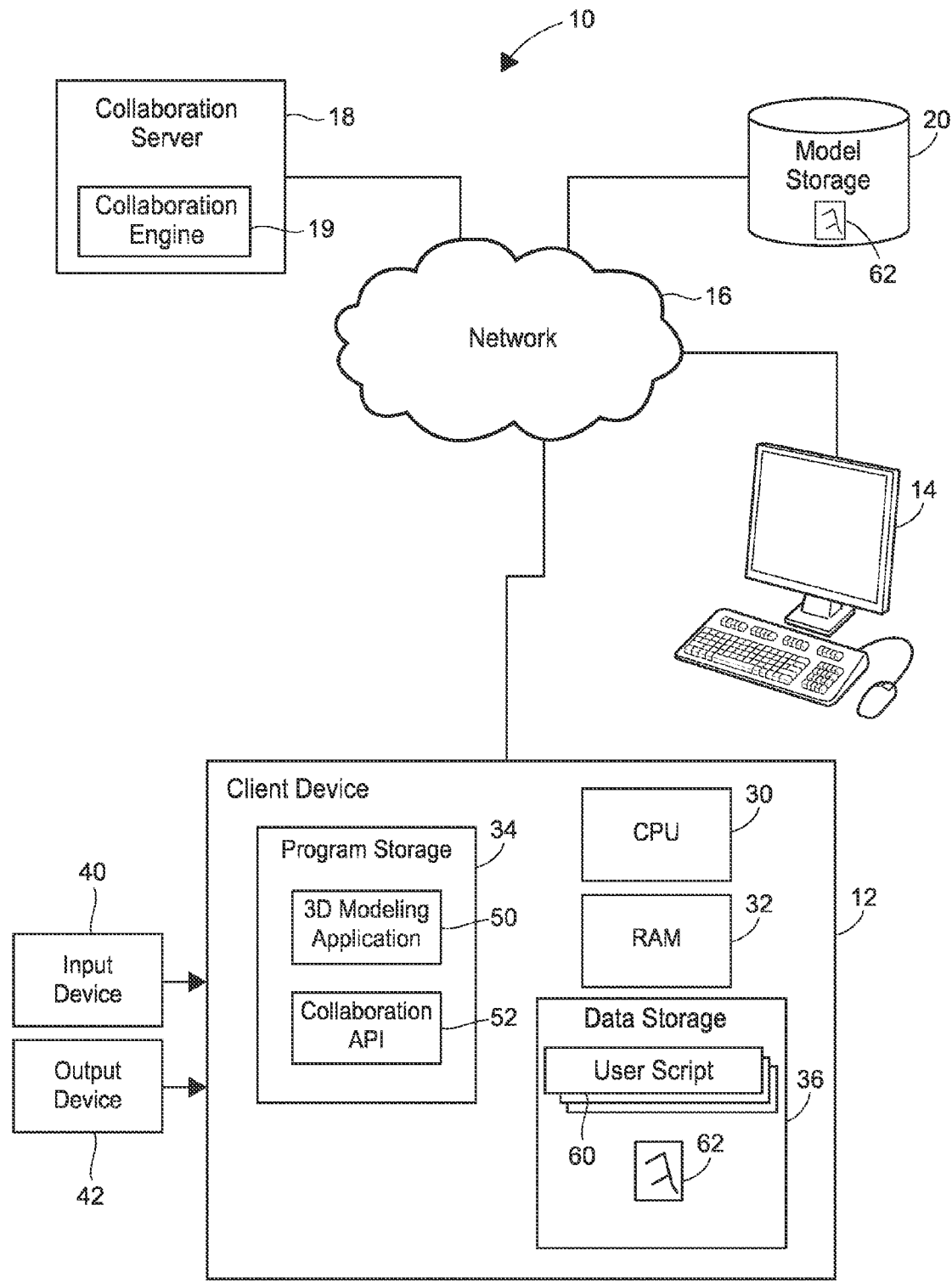
FIG. 1 is a block diagram of a communication system in which techniques of the present disclosure are utilized to allow several users operating respective client devices to collaboratively develop a three-dimensional (3D) model of an object or a group of objects.

In embodiments described below, a collaborative development system permits two or more users to use respective client devices operating on a local area network (LAN) or a wide area network (WAN) to jointly develop models of various objects such as, for example, buildings, vehicles, and items of furniture. The client devices, which may be personal computers (PCs), may include 3D modeling software which the corresponding users operate to create and edit 3D models or components of the models. In some embodiments, the 3D modeling software includes built-in functionality that allows users to invite other users to participate in the development of a model and propagate updates to models or components to the participating users. However, in other embodiments, 3D modeling software supports interactions with a 3D model only on an individual computing device, and the collaborative development system includes a software component (e.g., a plugin) that extends the functionality of the 3D modeling software so as to permit collaboration with another computing device.

To give users more flexibility, the collaborative development system provides collaborative functionality via an application programming interface (API), according to an embodiment. The API may allow users to select various mechanisms for resolving or preventing conflicts between concurrent edits. In an embodiment, the API includes a locking function to lock the model or a component of the model so as to reserve the model or the component for editing. In response to a user activating the locking function, the API may generate a locking notification to notify one or more client devices that the component has been locked. The API may also include a function for generating a description of the modifications applied to the component in terms of an operational transformation (OT) that allows client devices to modify the same component in parallel without locking the component. In an embodiment, to generate an OT representation of a modified component, the API also generates a serialized representation of the component, i.e., an ordered listing of the elements included in the component that allows the API to precisely indicate to which of the elements in the component a transformation has been applied. These and other techniques for notifying other client devices of changes to the model or portions of the model are discussed in more detail below. As also discussed below, a collaboration server operates on a communication network to facilitate interactions with models between several client devices, according to an embodiment. The collaboration server may resolve conflicts between concurrent operations by several users or propagate updates to models to client devices for local conflict resolution, depending on the embodiment.

Next, an example communication system in which techniques for collaborative 3D modeling can be applied is discussed with reference to FIG. 1. By way of example, collaborative development techniques are discussed below in relation to three-dimensional (3D) models such as those used by architects, engineers, and hobbyists. However, these or similar techniques also may be applied to two-dimensional (2D) drawings and other types of data.

Referring to FIG. 1, in an embodiment, a communication system 10 includes a client device 12, another client device 14 that operates independently of the client device 12, and a communication network 16 to which the client devices 12 and 14 are communicatively coupled. Although the client devices 12 and 14 include similar hardware, software, and/or firmware components, for ease of illustration, the components of only the client device 12 are shown in FIG. 1. In operation, a user operating the client device 12 develops a model of an object or a group of objects in collaboration with another user operating the client device 14. The communication system 10 may also include a collaboration server 18 in which a collaboration engine 19 facilitates interactions between the client devices 12 and 14 during the collaborative development process. The collaboration server 18 may be coupled to the client devices 12 and 14 via the communication network 16. Further, in an embodiment, the communication system 10 includes a model database 20 to store model data corresponding to various 3D models.

The client device 12 in some embodiments includes a central processing unit (CPU) 30 to execute computer-readable instructions, a random access memory (RAM) unit 32 to store data and instructions during operation, program storage 34 including persistent memory to store software applications, shared software components such as Dynamic-link Libraries (DLLs), and other programs executed by the CPU 30, and data storage 36 including persistent memory to store data used by the programs stored in the program storage 34. By way of example, the program storage 34 and the data storage 36 may be implemented on a hard disk drive (HDD) coupled to the CPU 30 via a bus. Generally speaking, the components 30, 32, 34, and 36 may be implemented in any suitable manner.

In the example implementation of FIG. 1, the client device 12 is a personal computer (PC). However, in general, the client device 12 may be any suitable stationary or portable computing device such as a tablet PC, a smartphone, etc. Although the computing device 12 in the example of FIG. 1 includes both storage and processing components, the client device 12 in other embodiments can be a so-called thin client that depends on another computing device for certain computing and/or storage functions. For example, in one such embodiment, the data storage 36 and the program storage 34 are external to the computing device 12 and are connected to the client device 12 via a network link. Further, the client device 12 may be coupled to an input device 40 and an output device 42. The input device 40 may include, for example, a pointing device such as a mouse, a keyboard, a touch screen, a trackball device, a digitizing tablet, or a microphone, and the output device 42 may include an LCD display monitor, a touch screen, or another suitable output device. Using the input device 40 and the output device 42, a user can access a graphical user interface (GUI) of the client device 12.

With continued reference to FIG. 1, the program storage 34 may store a 3D modeling application 50 for developing 3D models of various objects. The 3D modeling application 50 includes a set of complied instructions executable on the CPU 30, according to an embodiment. Generally speaking, the 3D modeling application 50 provides a set of modeling controls to generate, position, and variously adjust three-dimensional shapes, apply textures to the shapes or surfaces, define interactions between shapes, etc. Models developed using the 3D modeling software 50 may be stored on a computer-readable medium, such as the data storage 36, as data files including model data that conforms to a certain non-image format. For example, the non-image format may specify a set of faces of a 3D models along with the corresponding attributes, such as the position and orientation of a face, the texture of the face, etc. Further, model data may include a hierarchical tree data structure with branches on two or more levels describing respective components. An example tree data structure that may be used to store model data is discussed in more detail with reference to FIG. 3.

According to some embodiments, the 3D modeling application 50 includes an interface via which certain functionality and data structures of the 3D modeling application 50 are made accessible to other programs, so that the functionality of the 3D modeling application 50 may be extended to include additional features. In an embodiment, a collaboration Application Programming Interface (API) 52 provides collaboration capability to the 3D modeling application, so that a user operating the client device 12 and another user operating the client device 14 can develop a 3D model together at the same time. The collaboration API 52 may include functions for inviting collaborators, generating modification updates, locking and unlocking components for conflict-free editing, generating a representation of a component in a serialized format for sharing with another client device, etc.

In an embodiment, the collaboration API 52 allows a set of instructions in a scripting language (i.e., a script) interpretable by the 3D modeling application 50 to access certain classes used by the 3D modeling application 50 and invoke certain methods used by these classes. For example, one or several scripts 60 that utilize the collaboration API 52 may be stored in the data storage 36. In an embodiment, the scripts 60 are stored in a directory which the 3D modeling application 50 is configured to automatically access in order to locate and load scripts, when available. During execution, a user may activate a GUI control that causes the 3D modeling application 50 to interpret one of the scripts 60 that invokes the collaboration API 52. For example, one of the scripts 60 may provide a GUI control that, when activated, attempts to lock the selected component for editing only at the client device 12 when the corresponding model is being collaboratively developed. The script 60 may cause the collaboration API 52 to generate a message that identifies the component as well as a request to lock the component, and to transmit the message to the client device 14 via the network 16. Depending on the embodiment, the message may be transmitted directly to the client device 14 or to the collaboration server 18 that processes and forwards the message.

According to some embodiments, the collaboration API 52 is provided as a plugin, e.g., a compiled software component which the user of the client device 12 may install to add collaboration functionality to the 3D modeling application 50. In another embodiment, the collaboration API 52 may be provided as a non-optional component of the 3D modeling application 50. In yet another embodiment, the collaboration API 52 is provided as a script interpreted by the 3D modeling application 50 at runtime. In this embodiment, the script interacts with a general-purpose API for accessing the functionality to the 3D modeling application 50. In other words, the collaboration API 52 may be provided as a "basic" script to which the scripts 60 may add further functionality. The script in some embodiments may be provided in an encrypted (or "scrambled") form recognized by the modeling application 50.

The data storage 36 may store model data 62 that describes a 3D model being collaboratively developed at the client devices 12 and 14. In some embodiments, each of the client devices 12 and 14 maintains a respective copy of model data 62. In one such embodiment, the client devices 12 and 14 exchange real-time or periodic updates describing modifications to the model data 62 at the corresponding client device, so that the 3D modeling application 50 executing on the client device can appropriately update the local copy of the model data 62. In other embodiments, the collaboration server 18 additionally or alternatively updates a "master" copy of the model 62, stored in the model storage 20, according to the updates received from the client devices 12 and 14.

Figure 2:
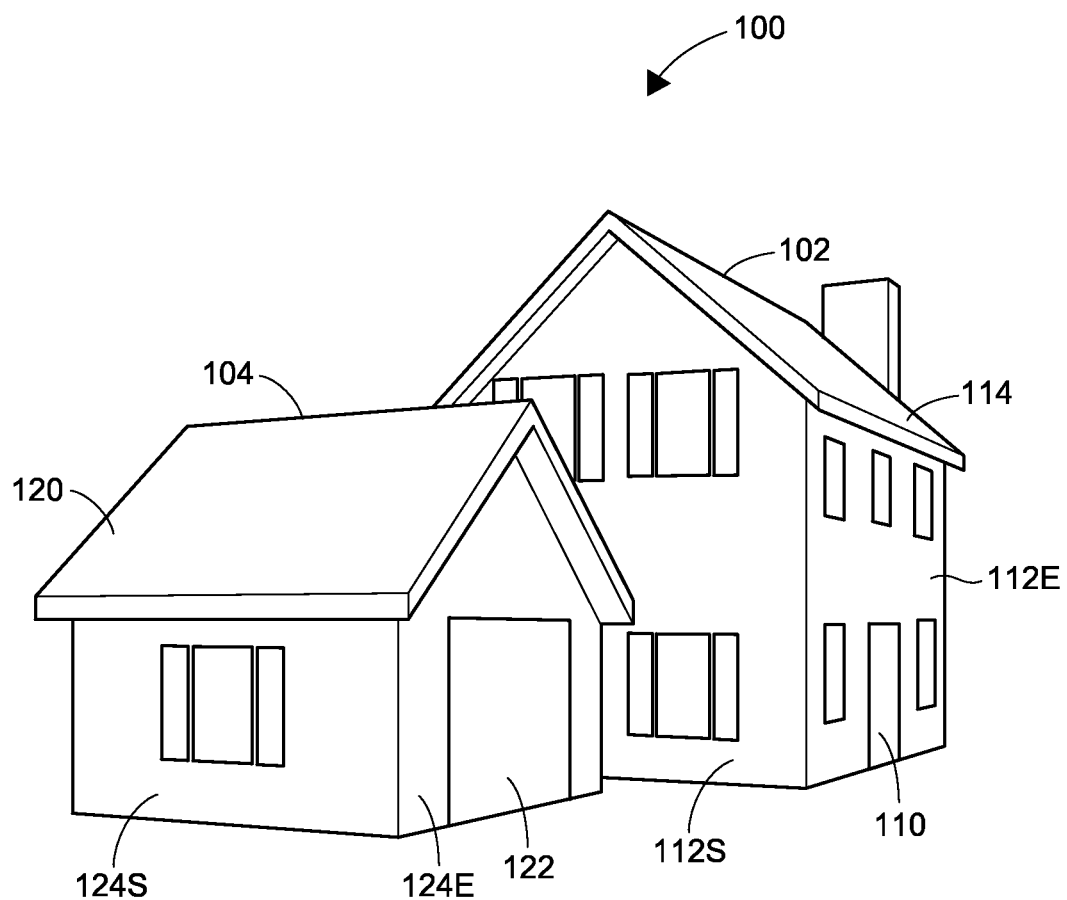
FIG. 2 is a rendering of an example model which users operating separate client devices of the communication system of FIG. 1 may collaboratively develop.

To consider an example collaborative modeling scenario with reference to FIGS. 1-4, user Abby operating the client device 12 begins to develop a 3D model such a model 100 illustrated in FIG. 2. User Abby initially is a single developer of the model 100. As can be seen in FIG. 2, the model 100 includes a house component 102 and a garage component 104. Each of the components 102 and 104 in turn may include several sub-components. For example, the house component 102 includes a door 110, walls including a southern wall 112S and an eastern wall 112E visible in FIG. 2, and a roof 114, while the garage component 104 includes a roof 120, a door 122, and walls including a southern wall 112S and an eastern wall 112E visible in FIG. 2. As also can be seen in FIG. 2, the model 100 may include other components such as windows and a chimney, for example, the discussion of which is omitted for ease of illustration. According to one embodiment, each of the components illustrated in FIG. 2 is made up of one or more elements such as 3D geographic shapes: cuboids, spheres, pyramids, etc. In another embodiment, the components of FIG. 2 may be generated using groups of two-dimensional faces: squares, circles, triangles, etc.

According to one embodiment, the 3D modeling application 50 generates components of the model 100 according to commands received from user Abby. For example, to draw the roof 120, Abby may draw multiple shapes and group the shapes using the user interface of the 3D modeling application 50 (e.g., by selecting several shapes with a mouse and activating an icon for generating a group of selected shapes). In general, a model can have nested components at multiple levels. For example, Abby may group several shapes to define a window frame component, then group the window frame component with several 3D shapes to define a window component, create several instances of the window component and group these several instances into a larger "multiple windows" component, etc. Further, in some embodiments, the 3D modeling application 50 may allows users such as Abby to first define components as groups including multiple 3D shapes (and possibly other components) and then generate multiple instances of the defined component. When a user later edits an instance of a component, the changes are automatically applied to other instances of the component, according to an embodiment.

Figure 3:
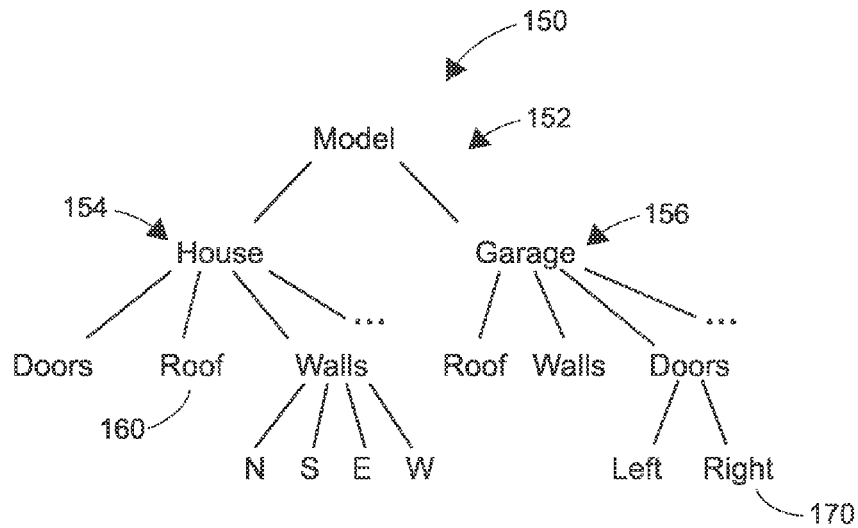
FIG. 3 is a diagram of an example data structure storing model data that describes the model of FIG. 2.

FIG. 3 is a schematic diagram of an example data structure 150 corresponding to the model 100, which the 3D modeling application 50 may generate when user Abby groups the shapes in the manner outlined above. After Abby creates the model 100, the 3D modeling application 50 initially may store model data 62 including the data structure 150 in the data storage 36. The data structure 150 includes a root node 152, a house branch 154, and a garage branch 156. Each of the branches 152 and 156 stores a particular component of the model 100. Further, the house branch 154 includes a roof branch 160 that corresponds to the roof component 114 as well as other branches corresponding to other components (a doors component, a walls component, etc.). As can be seen in FIG. 3, the garage branch 156 includes, among other branches, a doors branch with a right-door branch 170 that corresponds to the component 122. The right-door branch 170 may specify the component 122 as a set of 3D shapes, texture and/or color information, animation data, and other data. In general, a component may include drawing data, non-drawing data (text labels, metadata), and other components that also may include drawing and non-drawing data. In addition to the data structure 150, the model data 62 may include other information (e.g., metadata) such timestamp information, user information, etc.

In an embodiment, the collaboration API 52 utilizes the data structure 150 to represent a selected component of the model 100 in a serialized format. Generally speaking, by generating a serialized representation a component branch, a device operating in a collaborative development environment permits another device, such as a client device or a collaboration server, to properly resolve conflicts and address collisions between modifications submitted at several devices using OT techniques. A serialized representation of a branch may include a sequence of basic 3D shapes (cuboids, spheres, etc.) that make up the corresponding component, in an embodiment.

As an additional example, collaborative OT-based development of a text document may be briefly considered and contrasted with development of a 3D model. If two users collaboratively edit version V of a string of text S, such as "This is modeling," modifications to the string can be easily expressed in terms of text editing commands (e.g., insert, delete, replace, etc.) applied at specific character positions within the string S. For example, a first user may wish to insert the world "collaborative" following the eighth byte of the string S according to version V, and a second user may replace the word "is" in fifth and sixth bytes of the same version of the string S with the word "was." If the command from the second user is applied to the string S first, the unmodified command from the second user is then applied to the wrong portion of the string S. However, the commands from the first user and the second user can be easily reconciled by modifying the index at which the new word is to be inserted (in this case, the index can be modified to indicate the ninth byte rather than the eighth byte). In fact, in the example above, regardless of the order in which the two uses submit modifications to the string S, the conflict between the two commands is easily resolved, if the version V to which the corresponding command is applied is known. Thus, modifications to documents in which data is represented linearly (e.g., text documents) or in terms of numbered cells (e.g., spreadsheets) can be concurrently performed using indexing relative to a known version of the document. It is noted that this approach is compatible with lock-based as well as lock-free collaborative development.

On the other hand, unlike text or spreadsheet data, the model 100 is not easily described in a linear manner. The collaboration API 52 may generate the data structure 150 to describe the model as a hierarchical tree structure and, when necessary, generate serialized descriptions of branches to report updates to other devices, for example. The collaborative development system of FIG. 1 may define a set of operations recognized at participating client devices, such that the operations may be described with reference to the serialized descriptions of component branches. For example, the set may include such operations at delete, move, and resize. Thus, an OT-based description of how a certain component branch has been modified at a client device may include an indication that a delete operation was performed on the first sub-component (such as a cuboid) and a resize operation was performed on the fourth component (such as a sphere) in the serialized listing of the component, to consider just one example.

With continued reference to FIG. 3, 3D modeling application 50 and/or the collaboration API 52 may generate a unique component identifier for a branch in the data structure 150, so that when multiple users collaboratively develop the model 100, they can unambiguously identify components within each other's copies of the data structure 150. In one embodiment, the collaboration API 52 generates a component identifier for a component at the time when a user defines the component. For example, once Abby defines the garage component 104, the collaboration API 52 may generate a component identifier as a string of alphanumeric characters and store the generated component identifier as an attribute of the branch 156. In another embodiment, the collaboration API 52 generates a component identifier for a component in response to receiving an indication that a user wishes to edit the component during a collaborative development session. The component identifier in some embodiments is generated randomly. For example, the collaboration API 52 may generate the component identifier that conforms to a Globally Unique Identifier (GUID) format and as such is associated with a low probability of duplication. In an embodiment, the collaboration server 18 verifies whether the component identifier generated at the client device 12 is available. Further, the client device 12 may maintain a look-up table (e.g., a hash table) to quickly retrieve component identifiers for various components of the model 100.

Referring back to FIG. 1, Abby may then decide to invite another user, Bob, to edit or further develop the model in collaboration with Abby. To this end, Abby may activate a control provided by the collaboration API 52 (e.g., a toolbar icon or a button labeled "invite") to generate an invitation to Bob in the form of an electronic message transmitted over the network 16, for example. The invitation includes Bob's email address, in an embodiment. The collaboration API 52 may automatically prompt the user to supply a name for the model 100 and verify, using the collaboration server 18, whether the supplied name is unique. User Abby, for example, may name the model 100 AbbysModel. The collaboration API 52 also may automatically group all previously ungrouped geometry (i.e., 3D geometric shapes) under the root node 152 into a single component so as to enable component-by-component locking during subsequent collaborative development. In some embodiments, the collaboration API 52 then uploads the model data 62 to the model storage 20 automatically or in response to a corresponding command from Abby.

The collaboration API 52 does not directly provide user-level controls for collaborative 3D modeling, according to an embodiment. Instead, the collaboration API 52 may provide a library of functions which various programs, such as scripts interpreted at runtime by the 3D modeling application 50, may invoke according to the desired collaboration method. Further, in an embodiment, the collaboration API 52 includes an observer module that translates relevant user interface events (e.g., user clicking on a certain icon) into functions included in the collaboration API 52. Thus, the end user need not have any specific knowledge of the collaboration API 52, nor does the end user need to be aware of when functions of the collaboration API 52 are invoked. The library of functions may include, for example, an invite function to generate an invitation to a specified user or specified host, a group_geometry function to group the 3D shapes under the root node, etc. In this manner, the functionality of the 3D modeling application 50 can be extended to support collaboration in more than a single manner. For example, one of the scripts 60 may utilize the collaboration API 52 to provide a lock-based framework, a set of controls, and a mechanism to notify users of modifications performed at other client stations.

In an embodiment, the collaboration API 52 provides a transform function which a script or a compiled program may invoke with a parameter list that include the identifier of an entity (e.g., a component, an element such as a 3D basic shape, etc.), a transformation operation selected from a pre-defined list (e.g., translate, rotate, scale), and a user identifier. The collaboration API 52 also provides a new_component function to add a definition and/or an instance of a component under the root node 152. The new_component function may be invoked with a definition of the new component, a user identifier, and a component identifier. Also, the collaboration API 52 may include functions start_edit, edit, and end_edit, which the corresponding script invokes when a user begins to edit a component, edits the components, and completes editing the component, respectively. In an embodiment, invoking the function start_edit causes the collaboration API 52 to automatically lock the component, and invoking the function end_edit causes the collaboration API 52 to automatically unlock the component.

If desired, the collaboration API 52 also may support non-edit, or "social" operations. For example, the API 52 may provide a chat function to send a specified text string to a specified user. The API 52 also may provide a fly function to allow a user who has changed his eye location (i.e., the perspective of the model) to notify other users of the change. Further, the API 52 may provide a sync function to allow a user to request the latest version of model data from the collaboration server 18. Still further, the API 52 may provide enter and exit functions to permit a user to enter and exit a collaborative development session, respectively.

In the scenario considered above, the collaboration API 52 and/or the 3D modeling application 50 may transmit the invitation to the collaboration server 18 (and not directly to the client device 14). The collaboration server 18 then may include a link to the model data 62 and forward the invitation to Bob's email address. For example, the invitation may be formatted as follows: http://modelshare/AbbysModel.model, where .model is an extension used by the 3D modeling application 50. Once Bob receives, and attempts to process, the invitation, the copy of the 3D modeling application 50 executing on the client device 14 may verify that the collaboration API 52 (e.g., in the form of a plugin) is installed on the client device 14. If the collaboration API 52 is not yet installed on the client device 14, the 3D modeling application 50 may automatically prompt Bob to download and install the collaboration API 52. To this end, the invitation (or the model data 62) may include a link to a location from which the collaboration API 52 may be retrieved. Once the collaboration API 52 is installed, a copy of the model 62 may be received directly from the client device 12 or from the model storage 20 for editing at the client device 14, so that the copy stored at the model storage 20 corresponds to a "master copy" which the collaboration server 18 maintains according to the updates received from the client devices 12 and 14. However, in other embodiments, the collaboration server 18 does not maintain a master copy, and each of the client devices 12 and 14 locally manages a local copy of the model data 62.

After Bob has accepted Abby's invitation, Bob may begin to work on the 3D model 100 using the client device 14 at the same time as Abby. For example, Abby may wish to modify the house component 102, while Bob may wish to edit the garage component 104. However, it is also possible that both Abby and Bob may decide to edit the same component of the model 100 at the same time. Further, Abby and Bob may wish to modify components corresponding to different branches of the data structure 150. For example, Bob may wish to add a tool shed as a new component of the model 100 while Abby continues to edit the house component 102. Bob's addition in this case may require that a new branch be added directly under the root node 152. Depending on the embodiment, Bob would need to lock the entire model 100 to add a new component, lock only the root component while allowing modifications to be applied to the house branch 154, or not apply a lock at all and instead rely on an OT technique or a similar methodology to apply changes to the model 100 in a lock-free manner. As briefly discussed above, the collaborative development system of FIG. 1 may provide one or several mechanisms for avoiding or resolving conflicts between modifications applied at different client devices.

Figure 4:
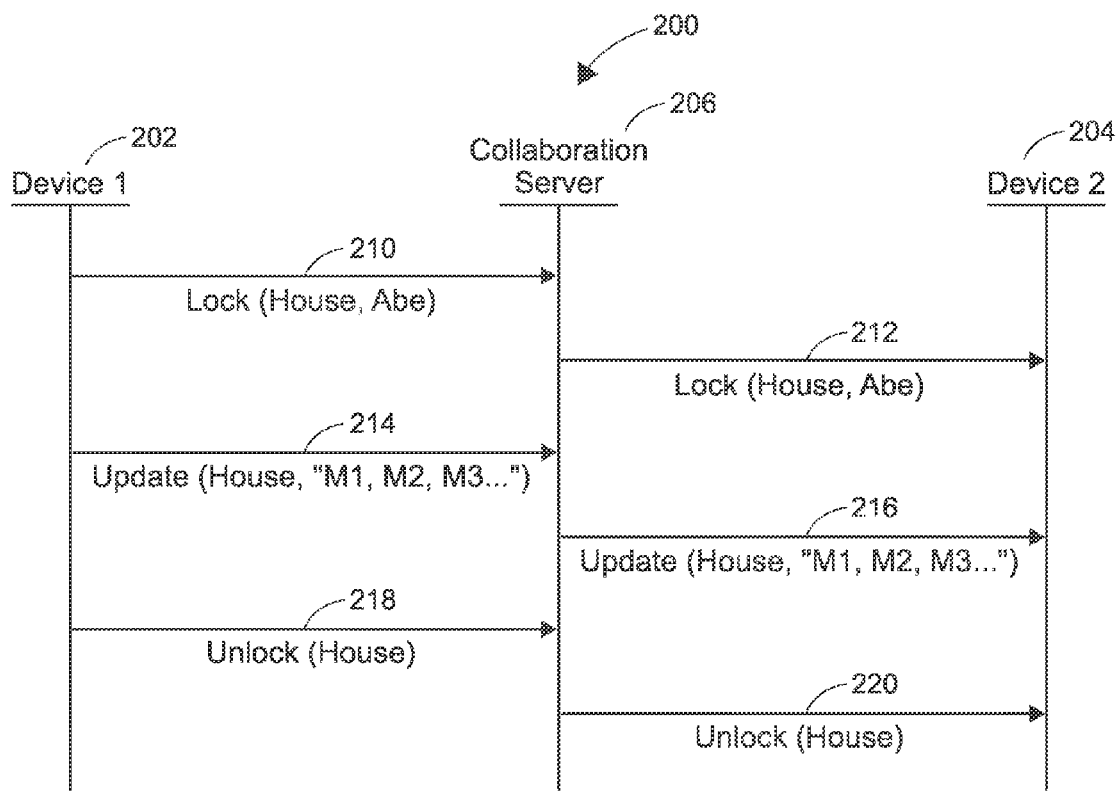
FIG. 4 is a messaging diagram that illustrates an example technique for collaborative 3D modeling at a pair of client devices communicatively coupled to a collaboration server.

FIG. 4 illustrates a diagram 200 of one example technique for modifying a selected component at a client device, operating in a collaborative modeling environment, using a lock. In the diagram 200, after one of devices 202 and 204 has accepted an invitation from the other one of the devices 202 and 204 to participate in collaborative development of a model, the device 202 communicates with the device 204 via a collaboration server 206 to negotiate the locking of a component, notify the other device of updates to the component, and later notify the other device that the component has been unlocked. In an embodiment, the technique of FIG. 4 is implemented in the communication network of FIG. 1 (for example, the client devices 12 and 14 may operate as devices 202 and 204, respectively, and the collaboration server 18 may operate as the collaboration server 206). However, it is noted that the technique illustrated in FIG. 4 also can be used in other suitable environments.

According to the example scenario introduced above, Abby may operate the device 202 and user Bob may operate the device 204. The device 202 may include 3D modeling software and a collaboration API similar to those discussed with reference to FIG. 1. Referring back to FIGS. 2 and 3, Abby may lock the branch 154 corresponding to the house component 102. The collaboration API (e.g., in response to a command from a script executing on the device 202) may generate a lock message 210 that identifies (i) the component 102 using, for example, a component identifier generated as discussed above, and (ii) Abby as the user requesting that the component 102 be locked for exclusive editing by Abby. The collaboration server 206 may verify that the component 102 has not yet been locked and forward the lock message 210 to the device 204 as a message 212. In an embodiment, the collaboration server 206 also updates the status of the component 102 in a table local to the collaboration server 206. In this manner, if another user attempts to lock the component 102, the collaboration server 206 may determine the status of the component 102 and reject the request to lock the component 102. Further, in some embodiments, the collaboration server 206 generates a lock confirmation message (not shown) and transmits the lock confirmation message to the device 202 in response to the lock message 210.

After the client device 202 has successfully locked the component 102, user Abby may modify the component 102. In particular, user Abby may apply a set of modification commands to the component 102 including, for example, commands to delete shapes, add shapes, reposition shapes, resize shapes, apply different colors or textures to elements, etc. Abby may then notify the collaboration server 206 of the modifications to the component 102 by activating a corresponding control on the user interface such as an update button, for example. The control causes an update message 214 to be generated including (i) an indication of the component to which modifications are applied and (ii) a description of the modifications and/or of the modified component, according to an embodiment. The update message 214 may include a version identifier to specify a version of the model (or the component) to which the modifications have been applied, in an embodiment. Similar to the examples discussed above, the 3D modeling software and/or the collaboration API executing on the client device 202 may provide functions and data structures to permit scripts to define user controls, generate and transmit messages, etc. In another embodiment, the collaboration API generates an update message automatically after a certain number of modifications applied to the currently locked component 102, periodically (e.g., once every two minutes), in response to detecting that Abby has finished her edits of the component 102, or according to another suitable scheme.

In still another embodiment, modifications of the model at the device 202 are reported to the device 204 in real time. For example, after a user moves the house component 102 via the user interface of the device 102, the modification is immediately reported as a move operation to the collaboration server 206 and thereafter forwarded to the client device 204. A user operating the device 204 may then see the modification on the user interface of the client device 204.

In an embodiment, the collaboration API of the device 202 generates a serialized representation of the branch that describes the component 102 to be included in the update message 214. For example, the collaboration API generates a linear listing of the elements and/or sub-components of the component 102, so that the one or several modifications of the component 102 applied at the device 202 can be specified relative to the specific elements included in the component 102. As a more specific example, referring back to FIG. 3, the elements under the house branch 154 (corresponding to the house component 102) may be sequentially listed as {Doors, Roof, N Wall, S Wall, E Wall, W Wall, . . . }. In this embodiment, the house branch 154 may be traversed in any suitable manner, but the traversal method at the device 202 should be recognized at the device 204 to avoid misalignment of elements.

In an embodiment, the serialized representation of the component branch 154 also may include an indication or description of modifications $M_1, M_2, \ldots M_N$ applied to the elements and components that make up the component branch 154. For example, the listing may include a description of the Roof component and an indication (a flag, a bitmask, etc.) that the Roof component has been modified at the device 202. In another embodiment, the update message 214 may identify only the modifications applied to the component 102 relative to a version of the component 102 available at the device 204 and/or the collaboration server 206. The description of modifications conforms to an OT format, according to some embodiments. Of course, the update message 214 in some cases may specify only one modification.

In another embodiment, the message 214 includes a description of a new version of the component and does not specifically indicate which elements within the component have been modified. Similar to the embodiment discussed above, the message 214 need not include a description of the entire model 100, and may include only the description of the modified component. However, according to this embodiment, another client device may simply replace an older version of the component with the new version. In general, the update message 214 may describe the house component 102 in any suitable manner.

With continued reference to FIG. 4, the collaboration server 206 may forward the update message 214 to the device 204 as a message 216. In an embodiment, the collaboration server 206 also modifies the master copy of the model according to the update message 214 and generates a new version identifier for the updated version. Referring back to FIG. 1, for example, the collaboration server 18 may update the copy of the model data 62 in the model storage 20. For example, if the update message 214 indicates that the modifications $M_1, M_2, \ldots M_N$ were applied to version V of the model, the collaboration server 206 may update the master copy of the model, generate version identifier V+1, store the new version identifier V+1 along with the modified master copy of the model, and include the version identifier V+1 in the forwarded message 216. In other embodiments, the collaboration server 206 does not update a master copy of the model and merely forwards the modification information to the device 204.

For ease of illustration, only one instance of the update message 214 is shown in FIG. 4. However, client device in general may transmit any number of update messages prior to unlocking the component. When Abby completes modifications to the component 102, the collaboration API may generate an unlock message 210 in response to Abby activating the corresponding control on the user interface of the device 202 (which in turn may be provided by a script executing on the device 202), for example. As illustrated in FIG. 4, the unlock message 210 may identify the component 102. The collaboration server 206 may forward the unlock message 210 to the client device 204 as a message 220. In an embodiment, the collaboration server 206 also updates the status of the component 102 and/or of the model 100 in the model storage 20.

Figure 5:
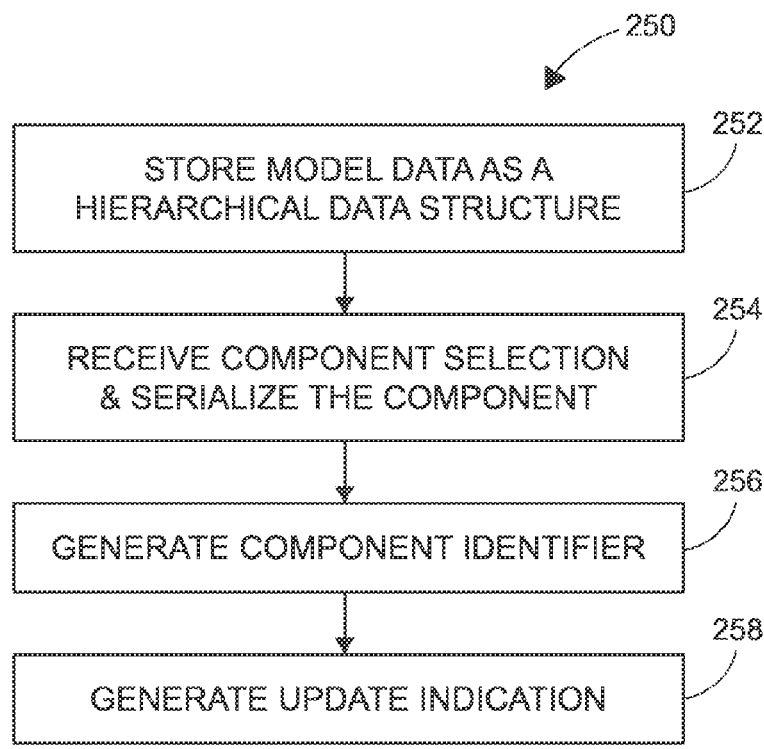
FIG. 5 is a flow diagram of an example method for generating an indication that a component of a model has been modified at a client device in a collaborative development environment.
Figure 6:
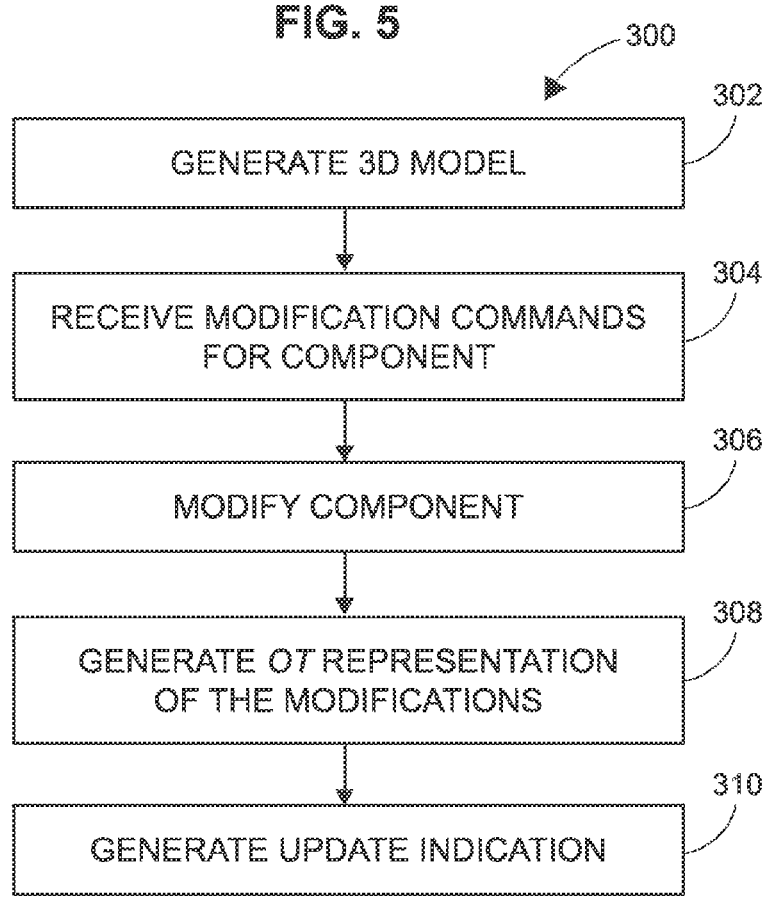
FIG. 6 is a flow diagram of another example method for generating an indication that a component of a model has been modified at a client device in a collaborative development environment.
Figure 7:
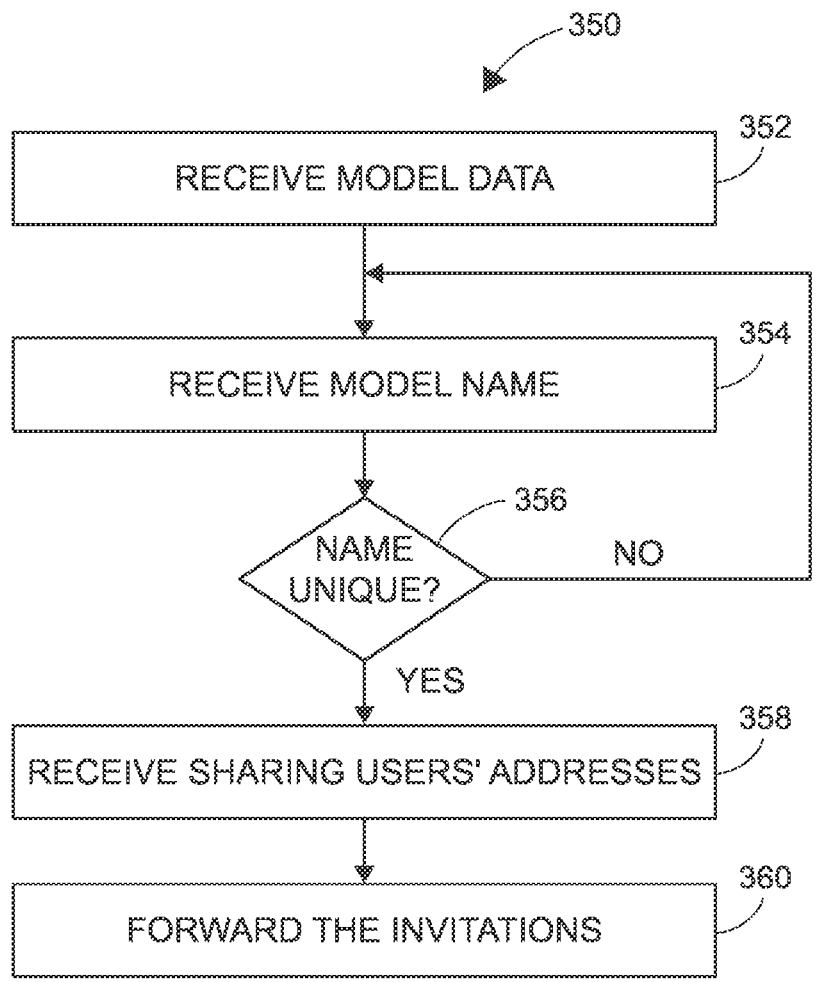
FIG. 7 is a flow diagram of an example method for processing an invitation for one or more users to join collaborative development of a model.
Figure 8:
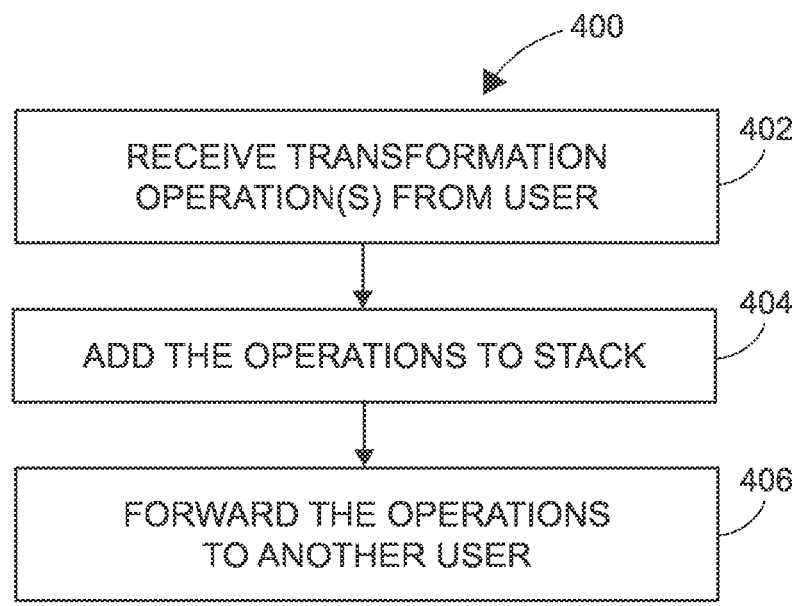
FIG. 8 is a flow diagram of an example method in a collaboration server for processing indications that a model has been updated at one or several client devices.
Figure 9:
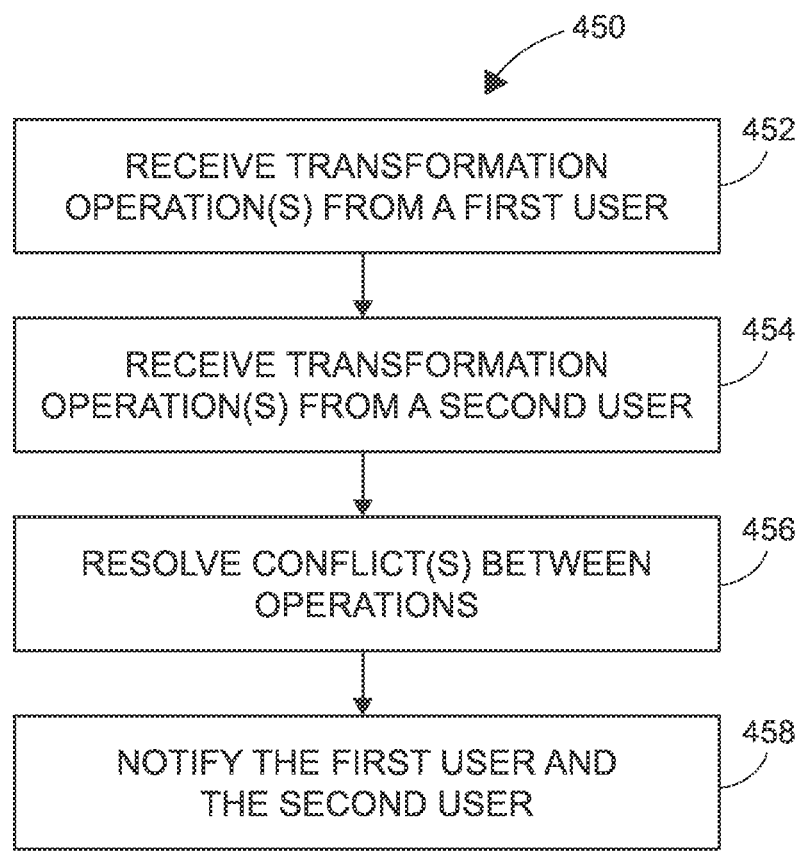
FIG. 9 is a flow diagram of another example method in a collaboration server for managing indications that a model has been updated at one or several client devices.

Next, several example methods that may be implemented in the communication system 10 or a similar environment to support collaborative development are discussed with reference to FIGS. 5-9. In particular, flow diagrams of several methods that can be implemented in a client device participating in collaborative 3D modeling on a network are illustrated in FIGS. 5-7, and flow diagrams of several methods that can be implemented in a collaboration server operating on a network are illustrated in FIGS. 8 and 9. In general, the methods of FIGS. 5-9 may be implemented using any suitable programming language and may be stored as instructions on a computer-readable medium. The instructions may execute on one or several processors, and may include compiled code, instructions interpreted by another software application (e.g., modeling software, a browser), or in any other suitable manner.

FIG. 5 is a flow diagram of an example method 250 for generating an update indication at a client device operating in a collaborative development environment. For example, the method 250 may be implemented in the client device 12 or 202 (in one embodiment, the method 250 is implemented in the collaboration API 52).

At block 252, model data corresponding to a 3D model is stored as a hierarchical data structure. For example, a tree data structure discussed with reference to FIG. 3 may be used. In general, the hierarchical data structure may include any desired number of levels and branches that may be specified by a user. Next, at block 254, a selection of a component of the model is received. In an embodiment, the user selects the component for editing by highlighting a visual representation of the component on a user interface, or by pointing to the visual representation of the component and activating a certain control (e.g., a button). In another embodiment, the user modifies a component, activates a control on the user interface, such as a button labeled update, and the modified component is automatically selected at block 254. In yet another embodiment, the component selection is received at block 254 in response to detecting that a user has modified the component via the user interface.

In some cases, several shapes in a model may be ungrouped at the time of selection. If the user selects one of the ungrouped shapes, these shapes may be automatically grouped into a component at block 254. Further, if the user selects several components corresponding to different branches of the data structure the lowest available parent branch that includes all of the selected branches is automatically selected. For example, if the user selects the wall 112S and the roof 114 of the model 100 depicted in FIG. 2, the entire house branch (branch 154 in FIG. 3) is selected.

Further, component data that includes a serialized representation of the selected component may be automatically generated at block 254. For example, the techniques discussed with reference to FIGS. 2-4 may be used. In an embodiment, the serialized representation of the component identifies modifications applied to particular elements within the component, so that OT techniques can be applied to resolve collisions between concurrent modifications at several client devices. In another embodiment, the serialized representation of the component describes the modified component without identifying particular changes to the component.

At block 256, a unique component identifier for the selected component may be generated as discussed above. Component data that includes the unique component identifier and, in an embodiment, the serialized representation of the component generated at block 254, is then provided in an update message generated at block 258. In an embodiment, the update message generated at block 258 is similar to the update message 214 of FIG. 4. In particular, in addition to the component identifier, the update message generated at block 258 may identify the user of the device in which the method 250 is being executed.

FIG. 6 is a flow diagram of another example method 300 for generating an update indication at a client device, where the user of the client device collaborates, in real time, with at least one other user using another client device. Similar to the method 250, the method 300 may be implemented in the client device 12 or 202, for example. In an embodiment, the method 250 is implemented in a 3D modeling software such as the 3D modeling application 50 and a collaboration API such as the collaboration API 52. Depending on the embodiment, blocks 302-310 of the method 300 are distributed between the modeling application and the collaboration API in any suitable manner.

At block 302, a 3D model is generated as discussed above in response to various user commands. The user may then decide to modify a component of the model and, at block 304, modifications commands may be received. The component may be modified in accordance with the received commands at block 306. Next, at block 308, component data including an OT representation of the modified may be generated. To this end, the techniques discussed above with reference to FIGS. 1-4 may be used. At block 310, an update indication that includes the OT representation may be generated. The update indication generated at block 310 also may include other component data such a component identifier that uniquely identifies the component, for example.

Next, FIG. 7 illustrates a flow diagram of an example method 350 for generating an invitation for one or more users to join collaborative development of a model. The method 350 is implemented in a collaboration API such as the collaboration API 52, according to an embodiment. At block 352, model data is received from a modeling application such as the 3D modeling software 50, for example, and a proposed name for the model may be received from a user via a user interface at block 354. Next, at block 356, it is determined whether the user-supplied name is unique. To this end, in an embodiment, the name is forwarded to a collaboration server. If the collaboration server determines that the name is unique, the collaboration server 18 provides a positive acknowledgement, and the flow proceeds to block 358. Otherwise, if the collaboration server determines that the name is not unique, the flow returns to block 354, and the user is asked to propose a different name for the model.

At block 358, one or more email addresses (or other suitable identifiers) of users being invited to participate in collaborative modeling are received. For example, an appropriate dialogue box, via which a user may enter an email address, may be displayed on the user interface. The invitations are then generated and forwarded at block 360 to the invited users either via a collaboration server or directly, depending on the embodiment. Depending on the embodiment, an invitation forwarded at block 360 may include one or more of an identifier of the user who has generated the invitation, the model data received at block 352 or a link to a location where the model data is stored (e.g., the model storage 20 illustrated in FIG. 1) and a link to a location from which a collaboration API can be downloaded (e.g., a website maintained by the collaboration server.

Now referring to FIG. 8, an example method 400 for processing update indications from one or several client devices can be implemented in the collaboration server 18, the collaboration server 206, or a similar device. At block 402, an indication of one or more transformation operations applied to a model is received from a client device. The operations (e.g., delete, move, resize) correspond to certain modifications of the model. In an embodiment, the transformation operations are reported along with an identifier of a version of the model to which the operations were applied, so that other devices may correctly apply these operations to the respective local copies of the model data.

At block 404, the received operations may be added to an operation stack. The operations may also be assigned unique identifiers, such as sequential numbers, so that the relative order of the operations is preserved. Using the operation stack, the collaboration server and/or client devices may determine which operations have been performed at the client devices. For example, the stack may store operations $O_1$ and $O_2$ prior to receiving the new operations $O_3$ and $O_4$ at block 402. The stack accordingly may store operations $O_1$ through $O_4$ upon executing the method steps at block 404. Next, at block 406, the operations $O_3$ and $O_4$ may be provided to one or several participating client devices automatically or in response to a query from a client device, depending on the embodiment.

In another embodiment, a client device participating in collaborative development may at some point "check in" with the collaboration server and indicate the last operation performed at the client device is. For example, the client device may identify operation $O_1$ as the last operation performed at the client device. In response, operations $O_2$ through $O_4$ may be retrieved from the stack and provided to the client device, similar to the steps performed at block 406.

Thus, according to the technique of FIG. 8, operations reported by a client device are not necessarily applied to a centrally maintained copy of the model. Instead, in at least some of the embodiments, the operations are forwarded to participating client devices as appropriate, and the client devices apply these operations to respective local copies of model data.

FIG. 9 is a flow diagram of another example method 450 that can be implemented in the collaboration server 18 or 206. According to the method 450, conflicts between concurrent modifications may be resolved at the collaboration server 18 or 206. In particular, at block 452, an indication of one or more transformation operations applied to a model is received from a first client device, and an indication of one or more transformation operations applied to the model is received from a second client device at block 452. The conflicts, if any, between the operations received at blocks 452 and 454 are resolved at block 456. Once the conflicts are resolved, the resulting operations are reported to the first user and the second user at block 458. Thus, if operations $O_1$ and $O_2$ are received from the first user and operations $O_3$ and $O_4$ are received from the second user, the result of executing the steps of the method 450 at block 456 may be that operation $O_3$ is skipped (e.g., rendered obsolete) and the operation $O_4$ is adjusted to correspond to the same type of an operation applied at a different place within a serialized representation of a component, for example.

By way of a more specific example, users Abby and Bob may be editing a model of a kitchen that includes a refrigerator. When Abby moves the refrigerator in her copy of the model, a corresponding operation is reported to the collaboration server (e.g., the collaboration server 18), and the operation is stored in the stack and assigned a certain number (e.g., "6"). Bob may observe Abby's modification and, not liking it, delete the refrigerator. The deletion may be added to the stack as operation 7. Meanwhile, Chad may be on a slow connection. Unaware that the refrigerator has been deleted, Chad moves the refrigerator, and the operation is added to the stack as operation 8. In this scenario, at block 456, operation 7 is recognized to have rendered operation 6 moot and operation 8 obsolete (as referring to a component that no longer exists). When Chad checks in to retrieve operations for application to his copy of model data, only operation 7 is provided. In an embodiment, at block 456, a master copy of the model is also updated in accordance in view of the results of conflict resolution between operations.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a collaborative development framework for 3D modeling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer usable memory storing an application programming interface (API) thereon for use with a software application for developing a three-dimensional (3D) model that is stored as model data and includes a plurality of components, each component having one or more elements, wherein the API includes a set of instructions that, when executed on a processor of a first computing device, cause the processor to:
   receive an indication that a selected one of the plurality of components has been modified by the software application in accordance with a set of one or more modification commands received from a user interface of the first computing device;
   generate component data including a linear listing of the one or more elements of the selected component such that the set of one or more modification commands applied to the selected component is specified relative to the one or more elements included in the selected component; and
   cause an update indication to be transmitted to a collaboration server via a communication network to synchronize the selected component between the first computing device and a second computing device, wherein the collaboration server is communicatively coupled to the first computing device and the second computing device, and wherein the update indication includes:
      the component data, and
      a component identifier that uniquely identifies the selected component.

2. The computer usable memory of claim 1, wherein the instructions further cause the processor to:
   generate an operational transformation (OT) representation of the set of one or more modification commands applied to the selected component; and
   provide the OT representation in the update indication.

3. The computer usable memory of claim 1, wherein the instructions further cause the processor to:
   receive an indication that the component has been selected for modification; and
   cause a lock request to be transmitted to the collaboration server in response to receiving the indication that the component has been selected for modification, including provide the component identifier in the lock request, whereby the collaboration server prevents modifications of the selected component by the second computing device.

4. The computer usable memory of claim 1 associated with a first memory component included in the first computing device, wherein:
   the second computing device includes a second memory component;
   each of the first computing device and the second computing device stores a respective copy of the model data respectively in the first memory component or the second memory component; and
   the instructions cause the processor to generate the component data using the copy of the model data stored in the first memory component.

5. The computer usable memory of claim 1, wherein:
   the software application runs as a compiled executable on the first computing device;
   the API is provided as a plugin that extends a functionality of the software application; and
   the API is invoked from a script interpreted by the software application at runtime.

6. The computer usable memory of claim 1, wherein the instructions further cause the processor to:
   generate an invitation for a user operating the second computing device to collaboratively develop the model, including:
      provide in the invitation an identifier of a user operating the first computing device, and
      provide in the invitation an identifier of the user operating the second computing device;
   cause the invitation to be transmitted to the collaboration server to be forwarded to the second computing device.

7. The computer usable memory of claim 2, wherein the model data includes a hierarchical tree data structure having a plurality of branches corresponding to the plurality of respective components of the model.

8. The computer usable memory of claim 2, wherein the OT representation is a first OT representation, and wherein the instructions further cause the processor to:
   receive an indication that the selected component has been modified at the second computing device, wherein the indication includes a second OT representation of modification commands applied to the selected component at the second computing device; and
   use the first OT representation and the second OT representation to modify the selected component in accordance with the set of modification commands applied to the selected component at the first computing device and the set of one or more modification commands applied to the selected component at the second computing device.

9. A method in a first computing device for developing a three-dimensional (3D) model in collaboration with a second computing device operating independently of the first computing device, wherein the model includes a plurality of components and wherein each component has one or more elements, the method comprising:

causing the model to be stored on a computer-readable medium as model data including a hierarchical tree data structure having a plurality of branches corresponding to the plurality of respective components;

in response to a selected component having been modified at the first computing device, generating a serialized representation of the branch that corresponds to the modified component; and causing the model to be synchronized between the first computing device and the second computing device, including causing an update indication to be transmitted to a collaboration server communicatively coupled to the first computing device and the second computing device, wherein the update indication includes the serialized representation of the branch and an indication of a set of transformation operations corresponding to modifications applied to particular elements within the modified component.

10. The method of claim 9, wherein generating the serialized representation of the branch includes generating an entity identifier to uniquely identify the modified component at the first computing device and the second computing device.

11. The method of claim 9, wherein generating the serialized representation of the branch includes generating a sequence of basic 3D shapes that make up the modified component to which the branch corresponds.

12. The method of claim 9, further comprising:

receiving a selection of the one of the plurality of components from a user interface of the first computing device;

receiving a plurality of modification commands from the user interface, wherein the plurality of modification commands correspond to a set of one or more transformation operations to be performed on the selected component; and modifying the selected component in accordance with the set of one or more transformation operations.

13. The method of claim 9, wherein causing the selected component to be synchronized comprises not including a serialized representation of unmodified components of the model in the update indication.

14. The method of claim 9, further comprising causing a lock request to be transmitted to the collaboration server in response to receiving the selected component, wherein:

a lock indication identifies the branch, and the collaboration server prevents modifications of the selected component by the second computing device.

15. The method of claim 9, further comprising:

receiving a selection of a plurality of elements from a user interface;

receiving a request to group the selected plurality of elements; and in response to receiving the request, associating the selected plurality of elements with a single component.

16. The method of claim 9, further comprising causing an invitation to collaboratively develop the model to be transmitted to the collaboration server, wherein the invitation identifies a user operating the second computing device.

17. The method of claim 9, wherein the update indication is a first update indication, the method further comprising:

receiving a second update indication from the collaboration server, wherein the second update indication is descriptive of a second one of the plurality of components, wherein the second one of the plurality of components has been modified at the second computing device; and causing the second one of the plurality of components to be displayed on a user interface.

18. The method of claim 9, wherein the update indication conforms to a format of an operational transformation (OT) system.

19. The method of claim 18, wherein:

each of the first computing device and the second computing device is associated with a respective storage device; and each of the first computing device and the second computing device operates on a respective version of the model data stored on the respective storage device.

20. The method of claim 14, wherein the lock request further indicates a user operating the first computing device.

21. A method in a first computing device for collaboratively developing a three-dimensional (3D) model stored as model data on a computer-readable medium, wherein the model data includes a hierarchical tree data structure having a plurality of branches corresponding to a plurality of respective components of the model, each component having one or more elements, the method comprising:

receiving a selection of one of the plurality of components of the model from a user interface of the first computing device;

receiving a plurality of modification commands from the user interface, wherein the modification commands correspond to a set of one or more transformation operations to be performed on the selected component;

modifying the selected component in accordance with the set of one or more transformation operations;

generating a serialized representation of one of the plurality of the branches that corresponds to the selected component; and causing the model to be synchronized with a second computing device, including:

causing an update indication to be transmitted to a collaboration server, wherein the update indication includes the serialized representation of the one of the plurality of the branches and an indication of the set of one or more transformation operations specified relative to one or more elements included in the selected component, and wherein the collaboration server is communicatively coupled to the first computing device and the second computing device.

22. The method of claim 21, wherein causing the update indication to be transmitted to the collaboration server further includes:

generating a unique component identifier to uniquely identify the selected component, and providing the unique component identifier in the update indication.

23. The method of claim 21, wherein causing the update indication to be transmitted to the collaboration server further includes providing a user identifier in the update indication, wherein the user identifier identifies a user operating the computing device.

\* \* \* \* \*